US012713278B2

(12) United States Patent
Yagi

(10) Patent No.: US 12,713,278 B2
(45) Date of Patent: Aug. 18, 2026

(54) ELECTRONIC APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Yuichi Yagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 18/755,341

(22) Filed: Jun. 26, 2024

(65) Prior Publication Data

US 2025/0008366 A1 Jan. 2, 2025

(30) Foreign Application Priority Data

Jun. 30, 2023 (JP) ................................ 2023-108525

(51) Int. Cl.
*H04W 28/02* (2009.01)
*H04W 48/20* (2009.01)
*H04W 84/12* (2009.01)

(52) U.S. Cl.
CPC ....... *H04W 28/0236* (2013.01); *H04W 48/20* (2013.01); *H04W 84/12* (2013.01)

(58) Field of Classification Search
CPC ......... H04W 28/0236; H04W 36/0058; H04W 36/0085; H04W 48/20; H04W 84/12
See application file for complete search history.

(56) References Cited

U.S. PATENT DOCUMENTS 9,706,469 B2 * 7/2017 Himayat ........... H04W 28/0846
2020/0288297 A1 9/2020 Li
2021/0045040 A1 * 2/2021 Panje .................... H04W 36/38
2021/0067987 A1 * 3/2021 Chen ..................... H04W 24/08

FOREIGN PATENT DOCUMENTS

JP 2021175068 A 11/2021

OTHER PUBLICATIONS

The LAN/MAN Standards Committee of the IEEE Computer Society, IEEE P802.11V/D16.0, Draft Standard for Information technology, Nov. 2010, pp. 1-428, NJ USA.

* cited by examiner

*Primary Examiner* — Zhensheng Zhang
(74) *Attorney, Agent, or Firm* — Canon U.S.A., Inc. IP Division

(57) ABSTRACT

There is provided an electronic apparatus that receives, from a first access point, a first request for requesting measurement results of qualities of signals from access points, and a connection destination change request; measures qualities of signals from the access points, based on received wireless signals; and performs control to, when the first request is received, in a case where the electronic apparatus is in a first operation state, make a response to the first access point, using a first content indicating results of measurement of qualities of signals from the access points, and in a case where the electronic apparatus is in a second operation state, make a response to the first access point, using a second content indicating that the qualities of signals from at least one of the access points is worse than the qualities of the signals measured by the measuring with respect to the at least one of the access points.

22 Claims, 9 Drawing Sheets

800

| CHANNEL NUMBER (801) | RECEIVED SIGNAL STRENGTH (802) | S/N RATIO (803) | BSSID (804) |
|---|---|---|---|
| 157 | 200 | 65 | conon12345678 |

| CHANNEL NUMBER | RECEIVED SIGNAL STRENGTH (805) | S/N RATIO (806) | BSSID |
|---|---|---|---|
| 157 | 1 | 1 | conon12345678 |

MFP
100
MAIN BOARD
211
212
CENTRAL PROCESSING UNIT (CPU)
213
ROM
214
RAM
227
FAX CONTROL UNIT
228
229
MODEM
215
NONVOLATILE MEMORY
216
IMAGE MEMORY
217
READING CONTROL UNIT
218
DATA CONVERSION UNIT
219
READING UNIT
220
OPERATION DISPLAY UNIT
221
ENCODING/DECODING PROCESSING UNIT
225
WIRELESS UNIT
226
222
PRINTING UNIT
223
PAPER FEEDING UNIT
224
PRINTING CONTROL UNIT
230
101
AP1
MOBILE TERMINAL DEVICE
104

MOBILE TERMINAL DEVICE 104
MAIN BOARD 411
412 CENTRAL PROCESSING UNIT (CPU)
413 ROM
214 RAM
415 IMAGE MEMORY
416 DATA CONVERSION UNIT
417 TELEPHONE UNIT
418 OPERATION UNIT
419 GPS
420 DISPLAY UNIT
421 CAMERA UNIT
422 NONVOLATILE MEMORY
423 DATA STORAGE UNIT
424 SPEAKER UNIT
425 POWER SUPPLY UNIT
426
WLAN UNIT 429
101 AP1
100 MFP

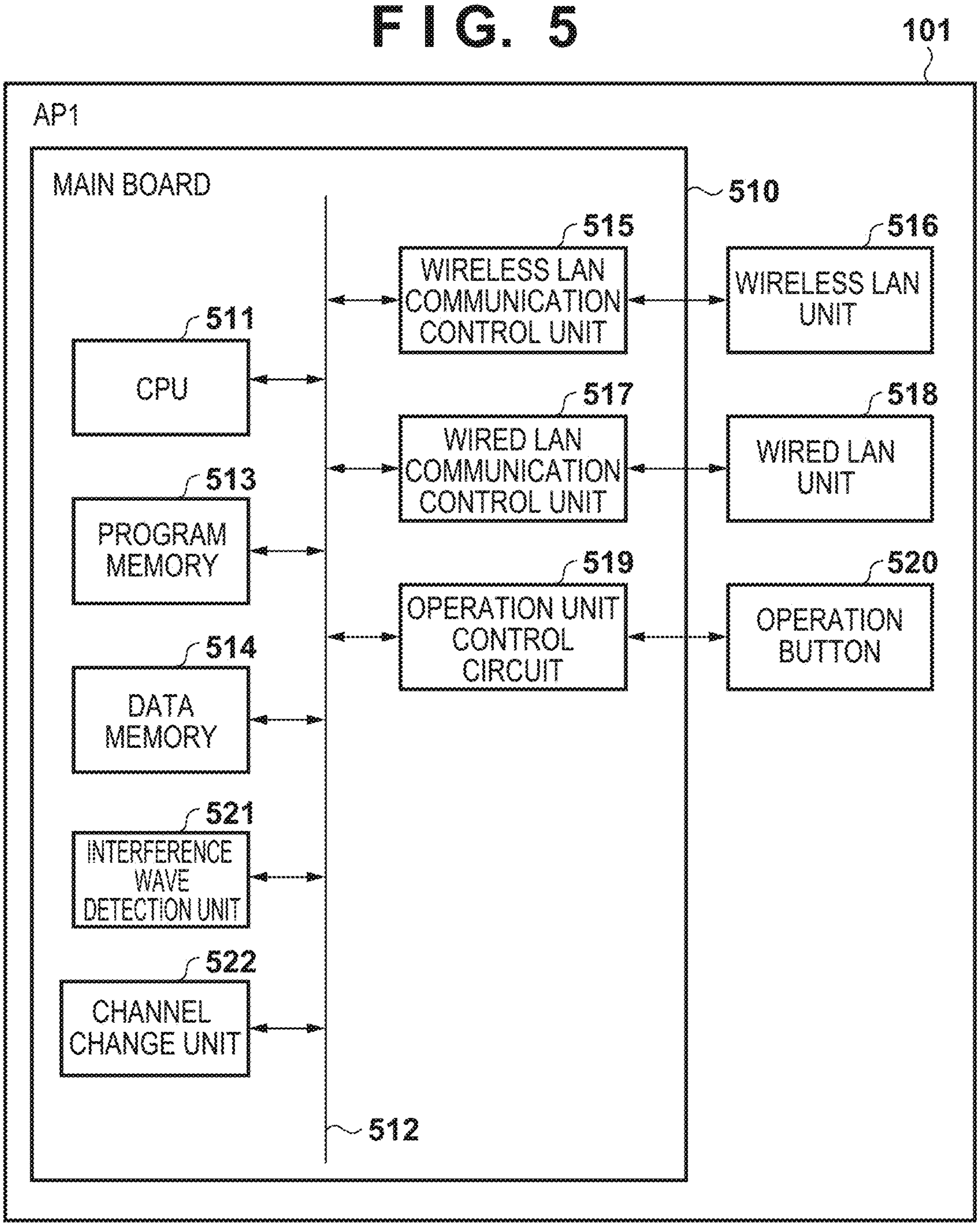
F I G. 5
101
AP1
MAIN BOARD
510
515
WIRELESS LAN COMMUNICATION CONTROL UNIT
516
WIRELESS LAN UNIT
511
CPU
517
WIRED LAN COMMUNICATION CONTROL UNIT
518
WIRED LAN UNIT
513
PROGRAM MEMORY
519
OPERATION UNIT CONTROL CIRCUIT
520
OPERATION BUTTON
514
DATA MEMORY
521
INTERFERENCE WAVE DETECTION UNIT
522
CHANNEL CHANGE UNIT
512

AP1
101
MFP
100
AP2
102
CONNECTED TO AP1
QUERY RADIO FIELD STRENGTH OF EACH AP FROM PERSPECTIVE OF STA
S601
SEARCH FOR NEIGHBORING AP
S602
RESPONSE OF RADIO FIELD STRENGTHS OF EACH AP FROM PERSPECTIVE OF STA
S603
DETERMINE WHETHER NECESSARY TO SWITCH
S604
REQUEST TO SWITCH TO AP2
S605
RESPONSE INDICATING ACCEPTANCE OF SWITCH TO AP2
S606
DISCONNECT AP1
S607
REQUEST CONNECTION TO AP2
S608
CONNECTED TO AP2
S609

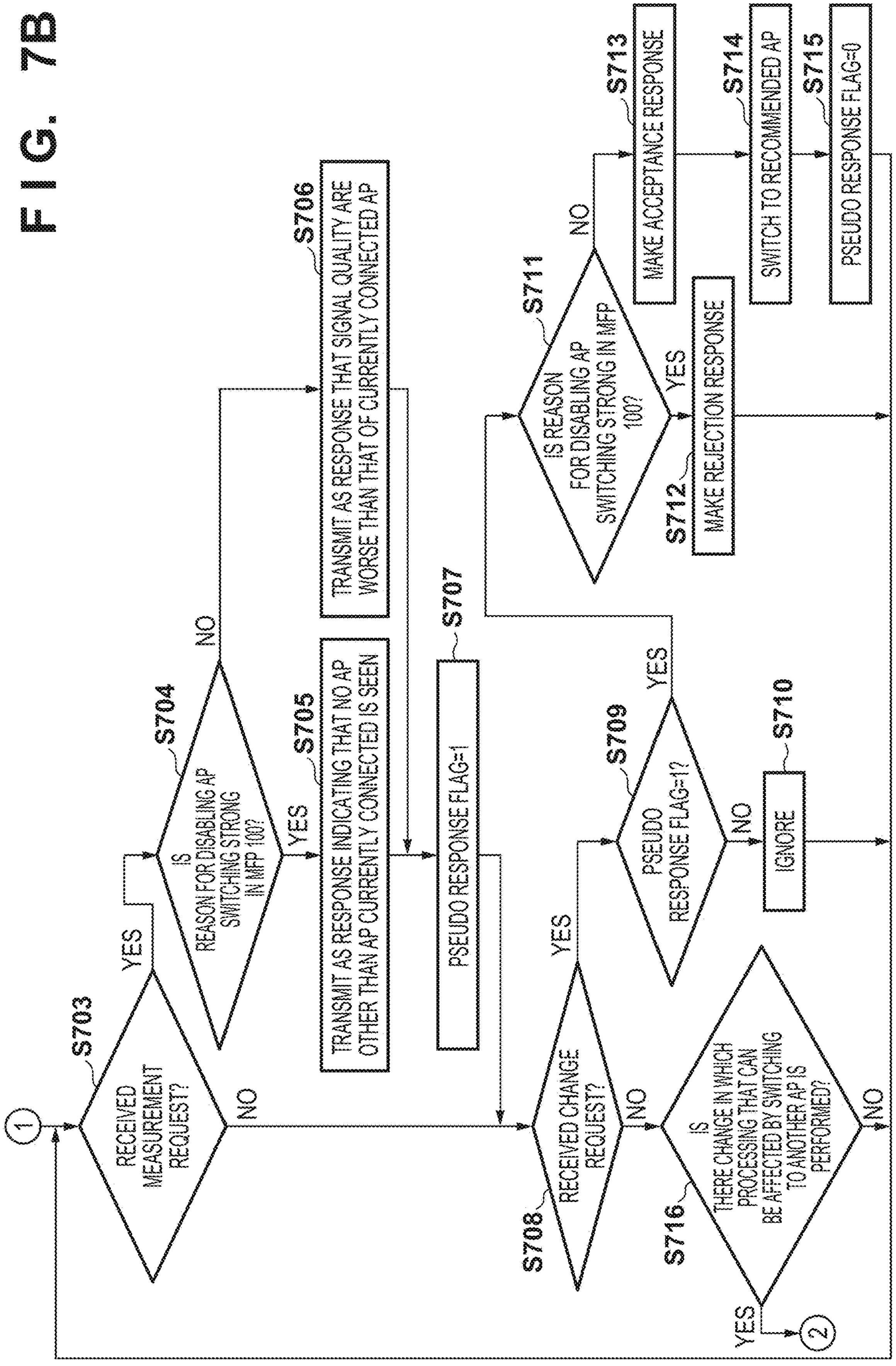

F I G. 7B
1
S703
RECEIVED MEASUREMENT REQUEST?
YES
NO
S704
IS REASON FOR DISABLING AP SWITCHING STRONG IN MFP 100?
YES
NO
S705
TRANSMIT AS RESPONSE INDICATING THAT NO AP OTHER THAN AP CURRENTLY CONNECTED IS SEEN
S706
TRANSMIT AS RESPONSE THAT SIGNAL QUALITY ARE WORSE THAN THAT OF CURRENTLY CONNECTED AP
S707
PSEUDO RESPONSE FLAG=1
S708
RECEIVED CHANGE REQUEST?
YES
NO
S709
PSEUDO RESPONSE FLAG=1?
YES
NO
S710
IGNORE
S711
IS REASON FOR DISABLING AP SWITCHING STRONG IN MFP 100?
NO
YES
S712
MAKE REJECTION RESPONSE
S713
MAKE ACCEPTANCE RESPONSE
S714
SWITCH TO RECOMMENDED AP
S715
PSEUDO RESPONSE FLAG=0
S716
IS THERE CHANGE IN WHICH PROCESSING THAT CAN BE AFFECTED BY SWITCHING TO ANOTHER AP IS PERFORMED?
YES
NO
2

| CHANNEL NUMBER (801) | RECEIVED SIGNAL STRENGTH (802) | S/N RATIO (803) | BSSID (804) |
|---|---|---|---|
| 157 | 200 | 65 | conon12345678 |

FIG. 8B

| CHANNEL NUMBER | RECEIVED SIGNAL STRENGTH (805) | S/N RATIO (806) | BSSID |
|---|---|---|---|
| 157 | 1 | 1 | conon12345678 |

ELECTRONIC APPARATUS, METHOD FOR CONTROLLING THE SAME, AND NON-TRANSITORY COMPUTER-READABLE STORAGE MEDIUM

BACKGROUND

Field

The present disclosure relates to an electronic apparatus capable of establishing a wireless LAN connection, a method for controlling the same, and a non-transitory computer-readable storage medium.

Description of the Related Art

For an extended service set (ESS) constituted by a plurality of access points (APs), there is a technology for dynamically switching between connection destination APs in order to efficiently exchange data between the APs and a station (STA). When it is determined that the connection destination AP is to be switched to another AP based on the congestion of the AP to which the STA is connected, the availability of the other APs, the radio wave conditions, and so on, the currently connected AP transmits a connection AP change request to the STA. When the STA receives an AP change request, the STA can connect to an appropriate AP by switching the connection destination AP according to the request.

Japanese Patent Laid-Open No. 2021-175068 discloses the following processing as processing in which a router with AP functions requests that a wireless adapter device connected thereto change the connection destination. A mobile router (MR1) that is capable of connecting to a plurality of wireless adapter devices checks whether or not a wireless adapter terminal is compatible with the IEEE 802.11v. Whether or not a wireless adapter terminal is compatible with IEEE 802.11v standard can be determined from an Association Request frame that the wireless adapter terminal transmits when wirelessly connecting to the MR1. When the wireless adapter terminal is compatible with the IEEE 802.11v standard, a BSS transition management (BTM) Request frame is transmitted to the wireless adapter terminal. The BSS Transition Candidate List Entries field of the BTM Request frame specifies the BSSID of a base station router RT2 as the connection destination. As a result, the wireless adapter terminal is prompted to switch the connection destination, and the wireless adapter terminal switches the connection destination from the MR1 to the RT2 according to the received BTM Request frame.

The STA has two states, one of which is a state in which no problem occurs even at AP switching, and the other is a state in which a problem occurs at AP switching or when the STA is disconnected from the AP to which the STA is currently connected. When in the state in which the problem occurs, if the STA receives an AP change request from an AP and the connection destination AP is switched to another AP in response to the request, a problem will occur in the STA.

SUMMARY

Various embodiments of the present disclosure aim to provide a technique for changing the connection destination access point more appropriately.

In order to solve the above problems, an electronic apparatus is provided that includes a communication module configured to receive a first request for requesting measurement results of qualities of signals from access points around the electronic apparatus, and a connection destination change request, the first request and the connection destination change request being transmitted from a first access point to which the electronic apparatus is currently connected. The electronic apparatus includes at least one memory and at least one processor which function as: a measuring unit configured to measure qualities of signals from the access points around the electronic apparatus, based on wireless signals received from the access points around the electronic apparatus; and a control unit configured to perform control to, when the first request is received, in a case where the electronic apparatus is in a first operation state, make a response to the first access point, using a first content indicating results of measurement by the measuring unit with respect to qualities of signals from one or more other access points different from the first access point, and in a case where the electronic apparatus is in a second operation state that is different from the first operation state, make a response to the first access point, using a second content indicating that the qualities of signals from at least one of the one or more other access points is worse than the qualities of the signals measured by the measuring unit with respect to the at least one of the one or more other access points.

According to various embodiments of the present disclosure, it is possible to change the connection destination access point more appropriately.

Further features of the present disclosure will become apparent from the following description of exemplary embodiments (with reference to the attached drawings).

BRIEF DESCRIPTION OF THE DRAWINGS

FIG. 5 is a diagram showing a configuration of an access point.

FIG. 7B is a flowchart illustrating an example of response transmission control processing performed in response to a measurement request from an AP.

FIG. 8A is a diagram showing part of a beacon report.

FIG. 8B is a diagram showing part of a beacon report.

DESCRIPTION OF THE EMBODIMENTS

Figure 1:
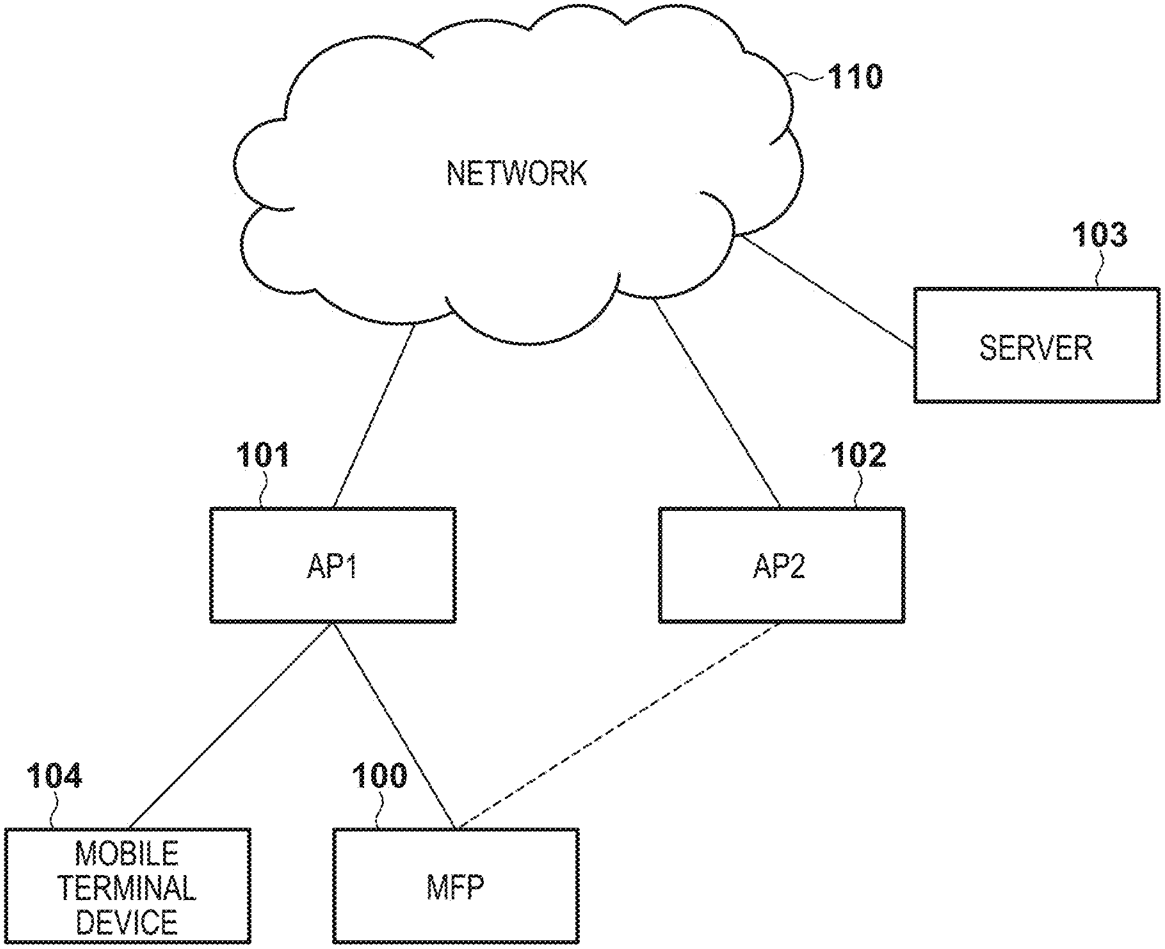
FIG. 1 is a diagram showing a system configuration.

Hereinafter, example embodiments will be described in detail with reference to the attached drawings. Note, the following embodiments are not intended to limit the scope of the claimed invention. Multiple features are described in the example embodiments, but limitation is not made to embodiments that requires all such features, and multiple such features may be combined as appropriate. Furthermore, in the attached drawings, the same reference numerals are given to the same or similar configurations, and redundant description thereof is omitted.

System Configuration

FIG. 1 shows an example of a configuration of a system according to the present embodiment. In one example, the present system is a wireless communication system in which a plurality of communication devices can communicate wirelessly with each other. In the example in FIG. 1, the system includes, as communication devices, a mobile terminal device 104, an MFP 100, APs 101 and 102, which are access points, a server 103, and a network 110. Note that the AP 101 and the AP 102 may be illustrated as an AP1 and an AP2. The mobile terminal device 104 is a device that has a wireless communication function using a wireless LAN or the like. Hereinafter, the wireless LAN may also be referred to as a WLAN. The mobile terminal device 104 may be a personal information terminal such as a personal digital assistant (PDA), a mobile phone (smartphone), a digital camera, a personal computer, or the like.

The MFP 100 is a printing device that has a printing function and may also have a reading function (scanner), a FAX function, and a telephone function. In addition, the MFP 100 according to the present embodiment has a communication function that enables the MFP 100 to perform wireless communication with the mobile terminal device 104. Although the present embodiment describes an example in which the MFP 100 is used, the present invention is not limited to such an example. For example, a scanner device, a projector, a mobile terminal, a smartphone, a laptop PC, a tablet terminal, a PDA, a digital camera, a music playback device, a television, a smart speaker, or the like each having a communication function may be used instead of the MFP 100. Note that "MFP" is an acronym for a Multi Function Peripheral.

The AP 101 is provided separately (externally) from the mobile terminal device 104 and the MFP 100 and operates as a WLAN base station device. A communication device having a WLAN communication function can perform communication in WLAN infrastructure mode via the AP 101. Hereinafter, each access point may be referred to as an "AP". In addition, the infrastructure mode may be referred to as a "wireless infrastructure mode". The AP 101 performs wireless communication with an (authenticated) communication device that is permitted to connect to the AP 101, and relays wireless communication between the communication device and another communication device. In addition, the AP 101 is connected to, for example, a wired communication network, and can relay communication between a communication device connected to the wired communication network and another communication device wirelessly connected to the AP 101.

The AP 102 has the same functions as the AP 101, and the MFP 100 switches the connection destination from the AP 101 to the AP 102 as necessary. The server 103 connects to the MFP 100 via the AP 101 and the network 110 and provides services to the MFP 100 in response to requests from the MFP 100. Here, the network 110 may be the so-called Internet, a closed network within a company, or a mobile phone network.

External Configuration of MFP

Figure 2A:
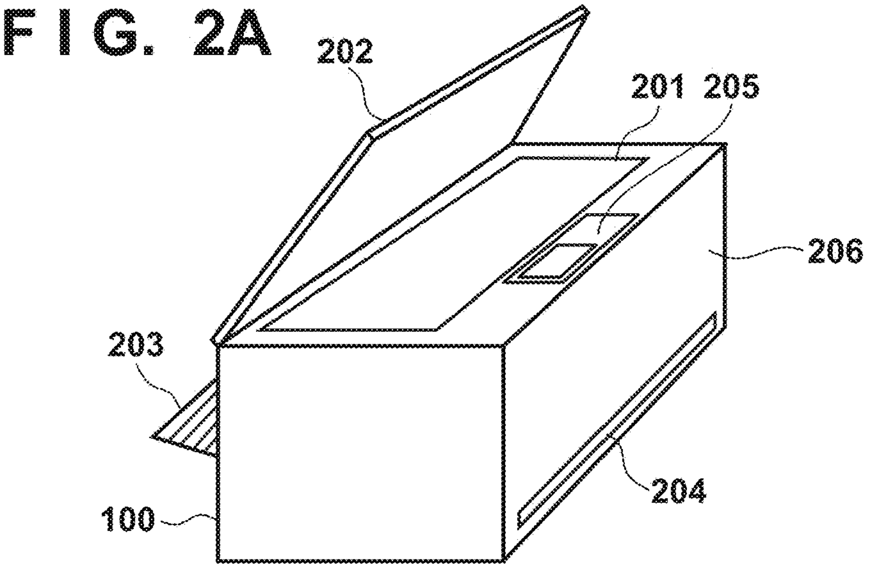
FIG. 2A is a diagram showing a configuration of an MFP.

FIG. 2A shows an example of an external configuration of the MFP 100. The MFP 100 includes, for example, a document table 201, a document cover 202, a printing paper insertion port 203, a printing paper discharge port 204, and an operation display unit 205. The document table 201 is a table on which a document to be read is placed. The document cover 202 is a cover that holds the document placed on the document table 201 and prevents light from a light source that illuminates the document during reading from leaking to the outside. The printing paper insertion port 203 is an insertion port into which paper of various sizes can be set. The printing paper discharge port 204 is a discharge port from which sheets of paper that have been printed are discharged. The sheets of paper set in the printing paper insertion port 203 are conveyed one by one to the printing unit, and after printing is performed in the printing unit, they are discharged from the printing paper discharge port 204. The operation display unit 205 includes keys such as character input keys, a cursor key, an enter key, and a cancel key, as well as an LED, an LCD, and so on, and is configured to be able to accept activation of various functions of the MFP and operation of various settings performed by the user. The operation display unit 205 may also include a touch panel display. The MFP 100 has a wireless communication function using a WLAN and includes a wireless communication antenna 206 for wireless communication, which does not necessarily have to be visible from the outside. As with the mobile terminal device 104, the MFP 100 can also perform wireless communication in the 2.4 GHz band and the 5 GHz frequency band using a WLAN.

Configuration of MFP

Figure 2B:
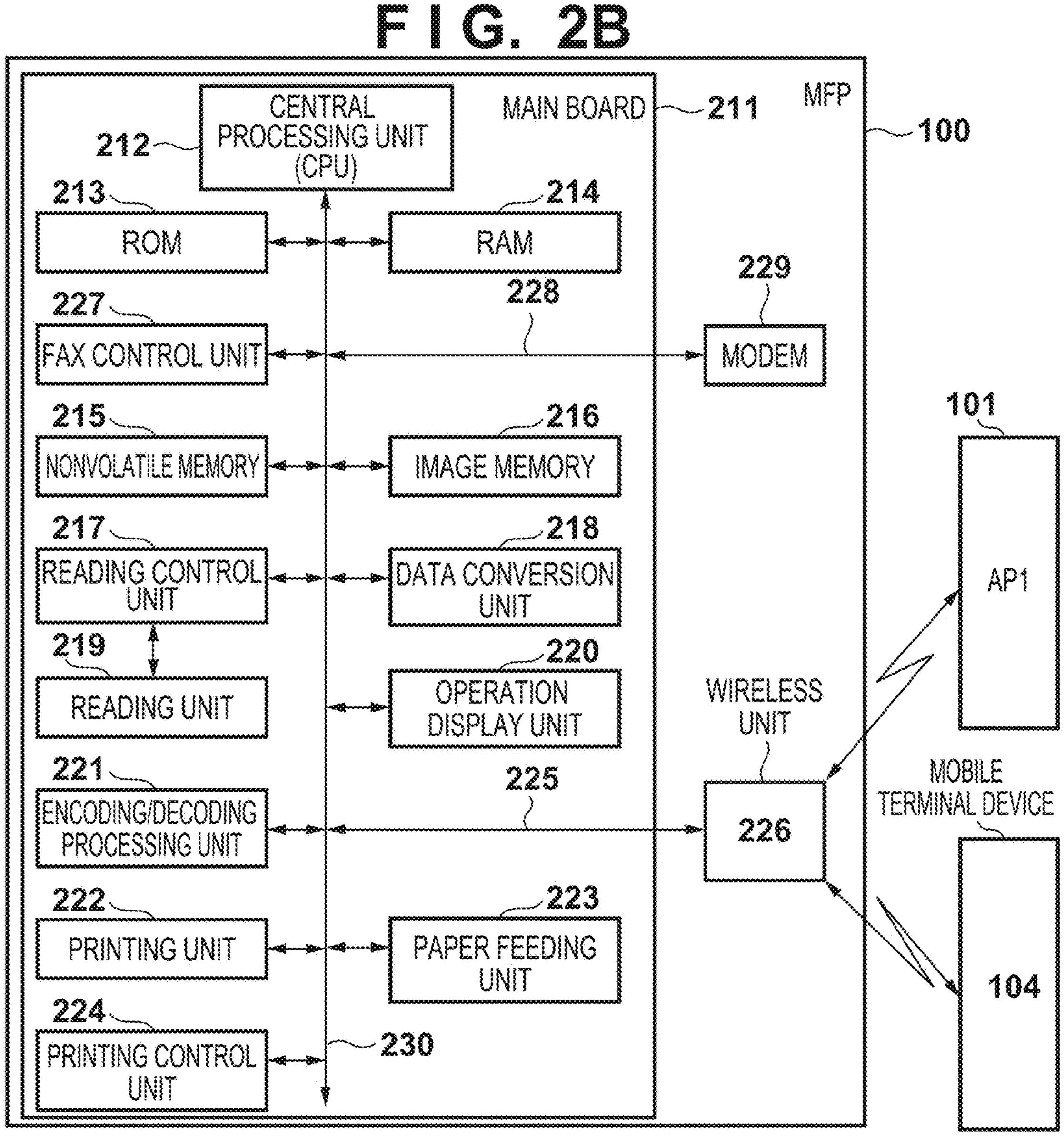
FIG. 2B is a diagram showing a configuration of the MFP.

FIG. 2B shows an example of a configuration of the MFP 100. The MFP 100 includes a main board 211 that performs main control on the MFP 100 itself, and a wireless unit 226, which is one communication module that performs WLAN communication using at least one shared antenna. In addition, the MFP 100 includes a modem 229 for wired communication, for example. The main board 211 includes, for example, a central processing unit (CPU) 212, a ROM 213, a RAM 214, a nonvolatile memory 215, an image memory 216, a reading control unit 217, a data conversion unit 218, a reading unit 219, and an encoding/decoding processing unit 221. In addition, the main board 211 includes, for example, a printing unit 222, a paper feeding unit 223, a printing control unit 224, and an operation display unit 220. These functional units within the main board 211 are interconnected via a system bus 230 managed by the CPU 212. The main board 211 and the wireless unit 226 are connected, for example, via a dedicated bus 225, and the main board 211 and the modem 229 are connected, for example, via a bus 228.

The CPU 212 is a system control unit that includes at least one processor and controls the entire MFP 100. In one example, the processing performed by the MFP 100 described below is realized by the CPU 212 executing a program stored in the ROM 213. Note that dedicated hardware for each kind of processing may be provided. The ROM 213 is an example of a computer-readable storage medium that stores control programs, a built-in OS program, and so on executed by the CPU 212. In the present embodiment, the CPU 212 performs software control such as scheduling and task switching by executing each control program stored in the ROM 213 under the management of the built-in OS also stored in the ROM 213.

The RAM 214 is constituted by an SRAM or the like. The RAM 214 stores data such as program control variables, setting values registered by the user, and management data of the MFP 100. The RAM 214 may also be used as various kinds of work buffers. The nonvolatile memory 215 is constituted by a memory such as a flash memory and continues to store data even when the MFP 100 is turned off. The image memory 216 is constituted by a memory such as a DRAM. The image memory 216 stores image data received via the wireless unit 226, image data processed by the encoding/decoding processing unit 221, and so on. Note that the memory configuration of the MFP 100 is not limited to the above configuration. The data conversion unit 218 analyzes data in various formats and converts image data to print data, for example.

The reading control unit 217 controls the reading unit 219 (for example, a contact image sensor (CIS)) to optically read a document placed on the document table 201. The reading control unit 217 converts an image obtained by optically reading a document into electrical image data (image signal) and outputs the image data. At this time, the reading control unit 217 may output the image data after performing various image processing such as binarization processing and halftone processing on the image data.

The operation display unit 220 is the operation display unit 205 described with reference to FIG. 2A and performs display on the display based on display control performed by the CPU 212, generates signals in response to acceptance of user operations, and so on.

The encoding/decoding processing unit 221 performs encoding processing, decoding processing, and scaling processing on image data (JPEG, PNG, etc.) handled by the MFP 100.

The paper feeding unit 223 stores sheets of paper for printing. The paper feeding unit 223 can supply the sheets of paper that have been set, under the control of the printing control unit 224. The paper feeding unit 223 may include a plurality of paper feeding units in order to store a plurality of types of paper in one device, and it is possible to perform control as to from which paper feeding unit paper is to be supplied, under the control of the printing control unit 224.

The printing control unit 224 performs various kinds of image processing such as smoothing processing, print density correction processing, and color correction on the image data to be printed, and outputs the processed image data to the printing unit 222. The printing unit 222 is configured to be able to perform, for example, inkjet recording printing processing, and records an image on a recording medium such as paper by ejecting ink supplied from an ink tank from a print head. Note that the printing unit 222 may be configured to be able to execute other kinds of printing processing such as electrophotography printing processing. The printing control unit 224 can periodically read out information regarding the printing unit 222 and update status information stored in the RAM 214, including the remaining amount of ink in the ink tank, the status of the print head, and so on.

The wireless unit 226 is a unit that can provide a WLAN communication function and can provide the same function as a combination of a WLAN unit 429 of the mobile terminal device 104, for example. That is, the wireless unit 226 converts data into packets and transmits the packets to another device in accordance with the WLAN standard and restores packets from another external device to original data and outputs the restored data to the CPU 212. The wireless unit 226 can perform communication as a station compliant with the IEEE 802.11 standard series. In particular, the wireless unit 226 can perform communication as a station compliant with the IEEE 802.11a/b/g/n/ac/ax. Hereinafter, the station may also be referred to as an STA. In addition, the wireless unit 226 can perform communication as an STA compatible with Wi-Fi Agile Multiband (trademark).

The wireless unit 226 is compatible with the IEEE 802.11ax, i.e., Wi-Fi6 (trademark), and the MFP 100 can also operate as an STA compatible with at least one of the orthogonal frequency-division multiple access (OFDMA) and the target wake time (TWT). The wireless unit 226 is compatible with the TWT, and therefore the timing of data communication from the base station device to the STA can be adjusted. The wireless unit 226 (MFP 100) serving as the STA causes the communication function thereof to enter a sleep state when there is no need to wait for signal reception. In this way, it is possible to reduce power consumption. The wireless unit 226 is also compatible with Wi-Fi 6E (trademark). In other words, the wireless unit 226 can also perform communication in the 6 GHz band (5.925 GHz to 7.125 GHZ). The target band for dynamic frequency selection (DFS), which exists in the 5 GHz band, does not exist in the 6 GHz band. Therefore, communication using the 6 GHz band will not be interrupted by DFS standby time, and more comfortable communication can be expected.

Note that the mobile terminal device 104 and the MFP 100 can perform P2P (WLAN) communication based on the WFD, and the wireless unit 226 has a software access point (soft AP) function or a group owner function. In other words, the wireless unit 226 can establish a network for P2P communication and determine a channel to be used for P2P communication.

Operation Display Unit of MFP

Figure 3A:
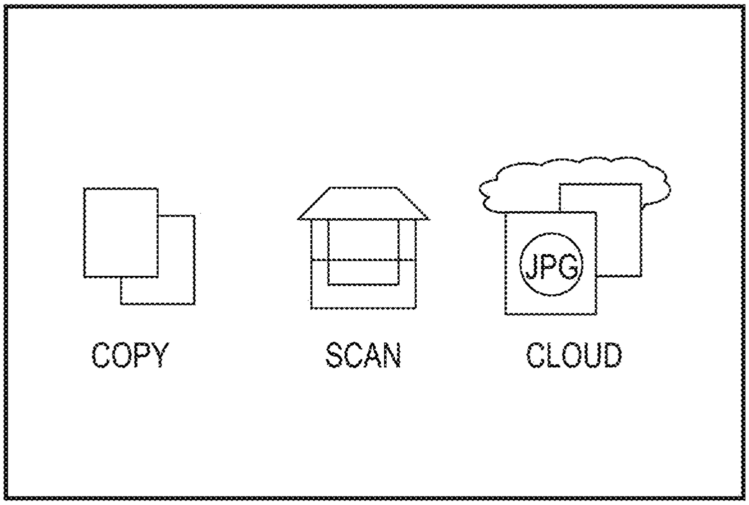
FIG. 3A is a diagram showing an operation display unit of the MFP.

FIG. 3 schematically shows an example of a screen display on a display (touch panel display) included in the operation display unit 220 of the MFP 100. FIG. 3A is an example of a home screen displayed when the MFP 100 is turned on and not performing an operation such as printing or scanning (an idle state, a standby state). In FIG. 3A, display items (menu items) corresponding to Copy, Scan, and Cloud are displayed. Cloud is a menu item related to cloud functions using Internet communication. When any of the menu items is selected through key operation or touch panel operation, the MFP 100 can start performing the setting or function corresponding thereto. The MFP 100 can seamlessly display a screen different from that shown in FIG. 3A by accepting a key operation or a touch panel operation on the home screen shown in FIG. 3A.

Figure 3B:
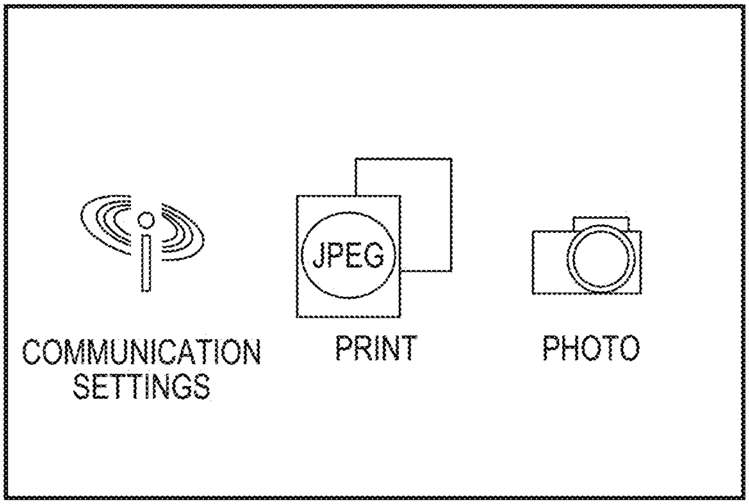
FIG. 3B is a diagram showing the operation display unit of the MFP.

FIG. 3B is an example of a display of another portion of the home screen, and is a screen transitioned from that in the state shown in FIG. 3A in response to an operation performed to display another page of the home screen (such as a slide operation to the left or the right). In FIG. 3B, display items (menu items) corresponding to Communication Settings, Print, and Photo are displayed. When any of these menu items is selected, the function corresponding to the selected menu item, i.e., the print function, photo function, or communication setting, is performed.

Figure 3C:
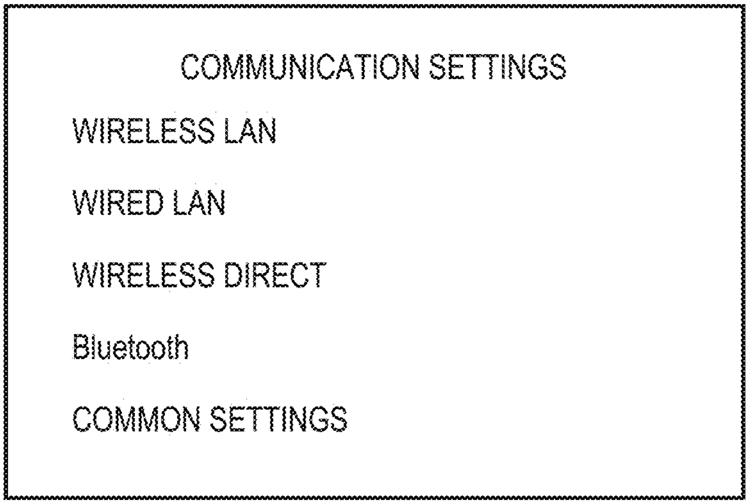
FIG. 3C is a diagram showing the operation display unit of the MFP.

FIG. 3C is an example of a display of a communication setting menu screen displayed when Communication Setting is selected on the screen shown in FIG. 3B. On the communication setting menu screen, "Wireless LAN", "Wired LAN", "Wireless Direct", "Bluetooth", and "Common" are displayed as menu items (options). "Wireless LAN", "Wired LAN", and "Wireless Direct" are menu items for LAN settings. For example, the wired connection settings, settings for enabling/disabling a wireless infrastructure mode, and settings for enabling/disabling a P2P mode such as the WFD and the soft AP mode, and so on can be performed using these items. When the item "Wireless LAN" is selected and a wireless LAN is enabled through a user operation, the wireless infrastructure mode is enabled. When the item "Wireless Direct" is selected and the wireless direct is enabled through a user operation, the P2P (WLAN) mode is enabled. This screen also displays a common setting menu item for displaying a common setting menu for each form of connection. Furthermore, the user can set the wireless LAN frequency band, frequency channel, and so on from this screen.

External Configuration of Mobile Terminal Device

Figure 4A:
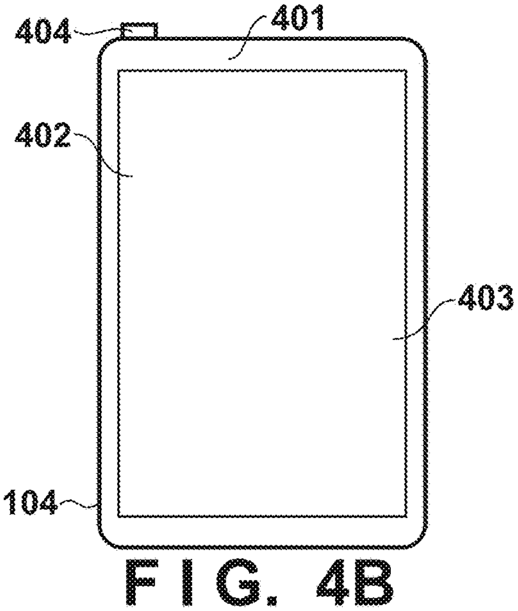
FIG. 4A is a diagram showing a configuration of a mobile terminal device.

FIG. 4A is a diagram showing an example of an external configuration of the mobile terminal device 104. The present embodiment shows an example in which the mobile terminal device 104 is a typical smartphone. Note that the mobile terminal device 104 includes, for example, a display unit 402, an operation unit 403, and a power key 404. The display unit 402 is, for example, a display that includes a liquid crystal display (LCD) type display mechanism. Note that the display unit 402 may display information using, for example, a light emitting diode (LED). In addition to or instead of the display unit 402, the mobile terminal device 104 may have the function of outputting information by voice. The operation unit 403 includes physical keys such as keys and buttons, a touch panel, and so on for detecting user operations. Note that in the present example, a shared touch panel display is used to display information on the display unit 402 and to accept user operations performed on the operation unit 403, and therefore the display unit 402 and the operation unit 403 are realized using a single device. In this case, for example, a button icon or a software keyboard is displayed using the display function of the display unit 402, and the operation acceptance function of the operation unit 403 detects that the user has touched these parts. Note that the display unit 402 and the operation unit 403 may be separated, and hardware for display and hardware for operation reception may be separately provided. The power key 404 is a physical key for accepting user operations for turning on or off the mobile terminal device 104.

The mobile terminal device 104 includes a WLAN unit 401 that provides a WLAN communication function, which does not necessarily have to be visible from the outside. The WLAN unit 401 is configured to be able to perform data (packet) communication in a WLAN system compliant with the, for example, the IEEE 802.11 standard series (IEEE 802.11a/b/g/n/ac/ax, etc.). In addition, the WLAN unit 401 can perform communication as an AP compatible with Wi-Fi Agile Multiband (trademark). However, the WLAN unit 401 is not limited to having such a configuration and may be capable of performing communication in a WLAN system compliant with other standards. In the present example, it is assumed that the WLAN unit 401 is capable of performing communication in both the 2.4 GHz and 5 GHz frequency bands. It is also assumed that the WLAN unit 401 is capable of performing WFD-based communication, soft AP mode communication, wireless infrastructure mode communication, and so on. Operations in these modes will be described later.

Configuration of Mobile Terminal Device

Figure 4B:
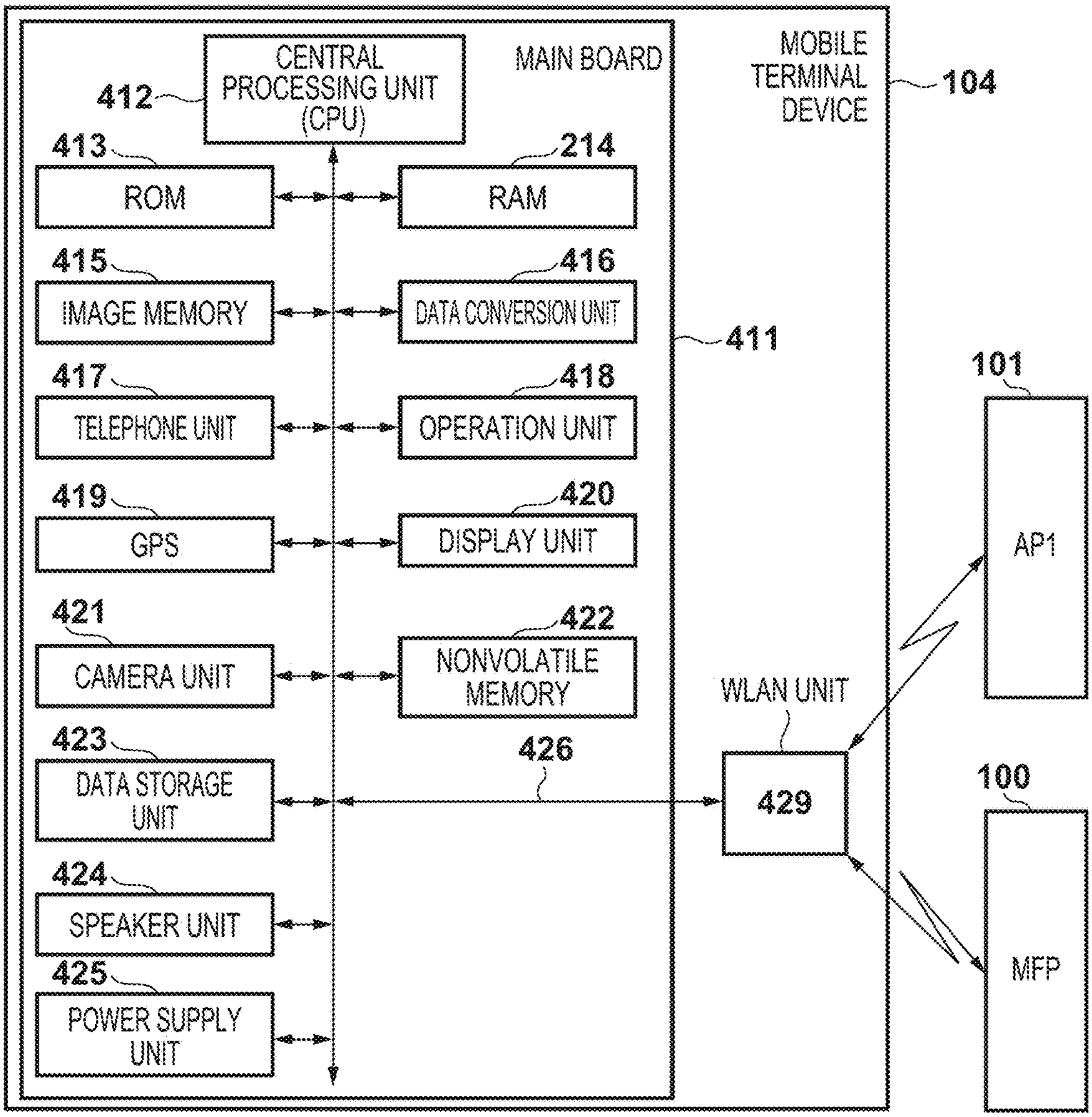
FIG. 4B is a diagram showing a configuration of the mobile terminal device.

FIG. 4B shows an example of a configuration of the mobile terminal device 104. In one example, the mobile terminal device 104 includes a main board 411 that performs main control on the mobile terminal device 104 itself, and a WLAN unit 429 that performs WLAN communication. The main board 411 includes, for example, a CPU 412, a ROM 413, a RAM 414, an image memory 415, a data conversion unit 416, a telephone unit 417, a GPS 419, a camera unit 421, a nonvolatile memory 422, a data storage unit 423, a speaker unit 424, and a power supply unit 425. Here, CPU is an acronym for Central Processing Unit, ROM is for Read Only Memory, RAM is for Random Access Memory, and GPS is for Global Positioning System. The mobile terminal device 104 includes a display unit 420 and an operation unit 418. These functional units within the main board 411 are interconnected via a system bus 628 managed by the CPU 412. In addition, the main board 411 and the WLAN unit 429 are connected via a dedicated bus 426, for example.

The CPU 412 is a system control unit that includes at least one processor and controls the entire mobile terminal device 104. In one example, the processing performed by the mobile terminal device 104 described below is realized by the CPU 412 executing a program stored in the ROM 413. Note that dedicated hardware for each kind of processing may be provided. The ROM 413 stores control programs, a built-in operating system (OS) programs, and so on executed by the CPU 412. In the present embodiment, the CPU 412 performs software control such as scheduling and task switching by executing each control program stored in the ROM 413 under the management of the built-in OS also stored in the ROM 413.

The RAM 414 is constituted by a static RAM (SRAM) or the like. The RAM 414 stores data such as program control variables, setting values registered by the user, and management data of the mobile terminal device 104. The RAM 414 may also be used as various kinds of work buffers. The image memory 415 is constituted by a memory such as a dynamic RAM (DRAM). The image memory 415 temporarily stores image data received via the WLAN unit 429 and image data read out from the data storage unit 423 in order to enable the CPU 412 to process such data. The nonvolatile memory 422 is constituted by a memory such as a flash memory and continues to store data even when the mobile terminal device 104 is turned off. Note that the memory configuration of the mobile terminal device 104 is not limited to the above-described configuration. For example, the image memory 415 and the RAM 414 may be shared, or the data storage unit 423 may be used to back up data. In addition, although a DRAM is used as an example of the image memory 415 in the present embodiment, another storage medium such as a hard disk or a nonvolatile memory may be used.

The data conversion unit 416 analyzes data in various formats and performs data conversion such as color conversion and image conversion. The telephone unit 417 controls the telephone line and processes voice data input and output via the speaker unit 424, thereby realizing communication by telephone. The GPS 419 receives radio waves transmitted from a satellite and acquires the current position information such as the latitude and the longitude of the mobile terminal device 104.

The camera unit 421 has the function of electronically recording and encoding an image input through a lens. Image data acquired through image capturing performed by the camera unit 421 is stored in the data storage unit 423. The speaker unit 424 performs control to realize the function of inputting or outputting voices for the telephone function, and other functions such as alarm notification. The power supply unit 425 is, for example, a portable battery, and controls power supply to the inside of the device. Examples of power states include an empty battery state where there is no battery power remaining, a power off state where the power key 404 has not been pressed, an active state where the device is normally active, and a power saving state where the device is active, but power consumption is reduced. The display unit 420 the display unit 402 described with reference to FIG. 4A, and displays various input operations, the operation state of the MFP 100, and a status, for example, under the control of the CPU 412. The operation unit 418 is the operation unit 403 described with reference to FIG. 4A. Upon receiving a user operation, the operation unit 418 performs control to, for example, generate an electrical signal corresponding to the operation and output the signal to the CPU 412.

The mobile terminal device 104 performs wireless communication using the WLAN unit 429 to perform data communication with another device such as the MFP 100. The WLAN unit 429 converts data into packets and transmits the packets to another device. In addition, the WLAN unit 429 restores packets transmitted from another external device to original data and outputs the original data to the CPU 412. The WLAN unit 429 is a unit for realizing communication compliant with each WLAN standard. The WLAN unit 429 can operate in at least two communication modes in parallel, including the wireless infrastructure mode and the P2P (WLAN) mode. Note that the frequency bands used in these communication modes may be limited by the functions and performance of the hardware.

Configuration of Access Point

FIG. 5 is a block diagram showing a configuration of the AP 101 having a wireless LAN access point function. The AP 101 includes a main board 510 that controls the AP 101, a wireless LAN unit 516, a wired LAN unit 518, and an operation button 520.

A CPU 511, which is in the form of a microprocessor disposed on the main board 510, operates according to a control program stored in a program memory 513, which is in the form of a ROM connected via an internal bus 512, and the content of a data memory 514, which is in the form of a RAM. The CPU 511 performs wireless LAN communication with another communication terminal device by controlling the wireless LAN unit 516 through a wireless LAN communication control unit 515. The CPU 511 performs wired LAN communication with another communication terminal device by controlling the wired LAN unit 518 through a wired LAN communication control unit 517. The CPU 511 can accept operations from the user operating the operation button 520 by controlling an operation unit control circuit 519. The CPU 511 includes at least one processor.

The AP 101 includes an interference wave detection unit 521 and a channel change unit 522. The interference wave detection unit 521 performs interference wave detection processing when wireless communication is performed using a band for which dynamic frequency selection (DFS) is performed. The channel change unit 522 performs processing to change the band to be used when it is necessary to immediately change to a free channel when an interference wave is detected while performing wireless communication using a band for which DFS is performed.

Note that the AP 102 has the same configuration as the AP 101.

P2P Communication Method

The following describes the P2P (WLAN) communication method in which devices directly communicate wirelessly with each other without using an external access point in WLAN communication. P2P (WLAN) communication can be realized using any of a plurality of schemes. For example, a communication device supports a plurality of modes for P2P (WLAN) communication and can selectively use any of the plurality of modes to perform P2P communication (WLAN).

The following two modes are considered as P2P modes:

Soft AP Mode

Wi-Fi Direct (WFD) Mode

A communication device capable of performing P2P communications may be configured to support at least one of these modes. On the other hand, even a communication device capable of performing P2P communication does not have to support all of these modes and may be configured to support only some of them.

A communication device having a WFD communication function (for example, the mobile terminal device 104) accepts a user operation through the operation unit thereof to call an application (which may be a dedicated application) for realizing the communication function. Thereafter, this communication device can display a user interface (UI) screen provided by the application to prompt the user to input an operation and perform WFD communication based on the user operation accepted in response.

Soft AP Mode

In the soft AP mode, a communication device (for example, the mobile terminal device 104) operates as a client that requests various services. The other communication device (for example, the MFP 100) operates as a soft AP that can perform the functions of a WLAN AP using software settings. Note that the commands and parameters transmitted and received when establishing a wireless connection between the client and the soft AP need only be those specified in the Wi-Fi (registered trademark) standard, and therefore the descriptions thereof are omitted here. The MFP 100 operating in the soft AP mode determines the frequency band and the frequency channel as a base station. Therefore, the MFP 100 can select which frequency band to use, 5 GHz or 2.4 GHz, and which frequency channel to use with this frequency band.

WFD Mode

The MFP 100 may be activated permanently as a base station in the WFD mode (Autonomous Group Owner). In this case, there is no need to perform GO Negotiation processing to determine the role. In addition, in this case, the MFP 100 determines the frequency band and the frequency channel as a base station. Therefore, the MFP 100 can select which frequency band to use, 5 GHz or 2.4 GHz, and which frequency channel to use with this frequency band.

Wireless Infrastructure Mode

In the wireless infrastructure mode, communication devices that communicate with each other (for example, the mobile terminal device 104 and the MFP 100) are connected to an external AP (for example, the AP 101) that controls the network overall, and communication between the communication devices is performed through the AP. In other words, communication between communication devices is performed through the network established by the external AP. The mobile terminal device 104 and the MFP 100 each discover the AP 101 and connect to the AP 101 by transmitting a connection request thereto, and as a result, these communication devices can communicate through the AP 101 in the wireless infrastructure mode. Note that each of a plurality of communication devices may connect to a different AP. In this case, data transfer between the APs enables communication between the communication devices. Note that the commands and parameters transmitted and received when the communication devices communicate with each other through the access point need only be those specified in the Wi-Fi standard, and therefore the descriptions thereof are omitted here. In addition, in this case, the AP 101 determines the frequency band and the frequency channel. Therefore, the AP 101 can select which frequency band to use, 5 GHz or 2.4 GHz or 6 GHZ, and which frequency channel to use with this frequency band.

Processing Performed in Response to Change Request to Change Connection Target from AP to STA The mobile terminal device 104 and the MFP 100 are compatible with the function published as Wi-Fi Agile Multiband (trademark). The Wi-Fi Agile Multiband is the function that makes it possible to select the optimal environment based on changing Wi-Fi network conditions. Specifically, STAs such as the mobile terminal device 104 and the MFP 100 and an AP such as the AP 101 exchange information regarding the network environment using the IEEE 802.11 series communication standard. Through such information exchange, the AP can redirect the STA (change the connection destination) to another AP, frequency band, channel, or even another cellular service if the network is congested.

Figure 6:
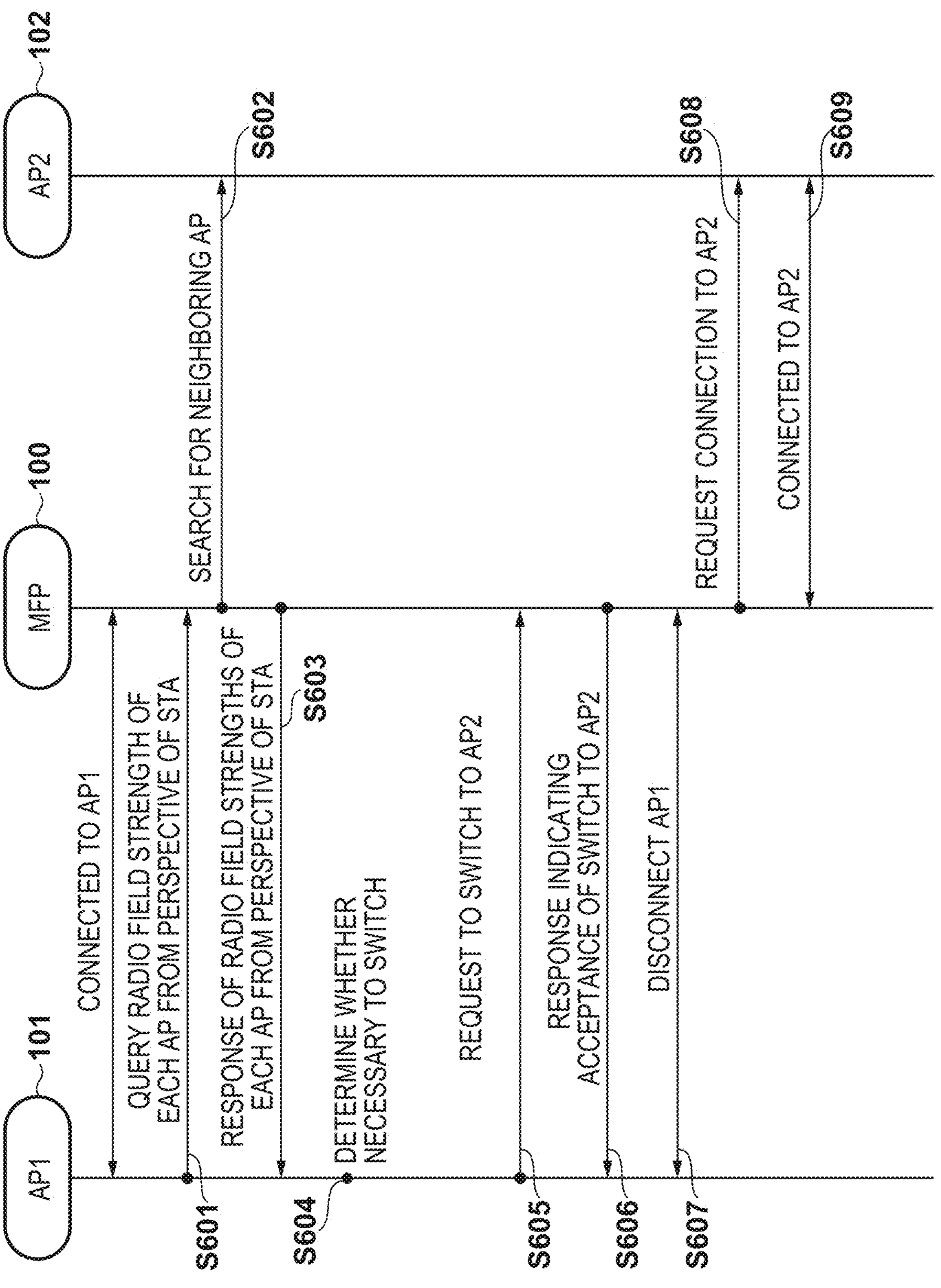
FIG. 6 is a sequence diagram illustrating processing that is performed in response to a connection destination change request from an AP.

FIG. 6 is a sequence diagram in a case where the MFP 100 switches the connection destination AP from the AP 101 to the AP 102 in response to a connection destination change request from the AP 101. The processing performed by each device in this sequence is realized by the CPU included in the device reading out various programs stored in a memory such as a ROM included in the device to a RAM included in the device and executing the programs.

It is assumed that in the initial state of the processing in FIG. 6, the MFP 100 has established a connection to the AP 101 in the wireless infrastructure mode. It is also assumed that the AP 101 has acquired information regarding whether or not the MFP 100 is compatible with the IEEE 802.11v when the MFP 100 and the AP 101 connect to each other in the wireless infrastructure mode, and the AP 101 performs the following processing when the AP 101 has acquired information indicating that the MFP 100 is compatible with the IEEE 802.11v.

In step S601, the AP 101 transmits, to the MFP 100, an inquiry (a measurement request) regarding the signal quality (radio field strengths and so on) of signals from APs around the MFP 100. For example, a beacon frame request or a beacon report request may be included in the measurement request to be transmitted. That is to say, this request can be made using the mechanism specified in the IEEE 802.11k standard. In one example, the measurement request may be a measurement instruction that instructs the MFP 100 to measure the received signal strengths or signal-to-noise ratios of predetermined wireless signals such as beacon signals transmitted from APs around the MFP 100. In other words, the wireless unit 226 of the MFP 100 functions as a receiving unit that can receive a measurement request.

In step S602, in response to the request received in step S601, the MFP 100 receives frames transmitted from APs around the MFP 100 and measures the received signal strengths.

As a result, the respective received signal strengths of the plurality of APs including the AP 101 and the AP 102 are measured. In one example, the MFP 100 may store measurement results regarding the frames transmitted by the APs around the MFP 100 in a storage device such as the RAM 214 or the nonvolatile memory 215. Therefore, the CPU 212 of the MFP 100 functions as a measuring unit that controls the wireless unit 226 and measures the signal quality of signals from the access points around the MFP 100.

In step S603, the MFP 100 transmits a list of the received signal strengths of the signals from the APs around the MFP 100 measured in step S602 as a response to the request received in step S601. Note that the received signal strengths to be transmitted as a response may be information stored in the RAM 214 and the nonvolatile memory 215 of the MFP 100 in addition to, or instead of, the information measured in step S602. This response to be transmitted includes, for example, a beacon report or a measurement report.

In step S604, the AP 101 determines whether or not it is necessary to switch the connection destination of the MFP 100, based on the congestion on the network that the AP 101 knows, and the received signal strength of the frame received from the MFP 100 in step S603. Factors that cause the AP 101 to determine that connection switching is necessary include a large number of connected STAs, a large amount of communication, other APs that are less congested, the presence or absence of radio interference, and AP function suspension. If the AP 101 determines that it is necessary to switch the connection destination of the MFP 100 and determines the SSID of another AP to be designated as the switching target of the MFP 100, the channel, and the frequency band, processing proceeds to step S605.

In step S605, the AP 101 transmits an AP change request (connection destination switching request) to the MFP 100. The connection destination change request includes information determined in step S604 regarding the SSID of the other AP to be designated as the switching target of the MFP 100, the channel, and the frequency band. Note that a plurality of SSIDs may be designated. The connection destination change request is transmitted as a BTM Request, for example. That is to say, a BSS transition management (BTM) Request frame specified in the IEEE 802.11v standard is transmitted. In the example in FIG. 6, it is assumed that the AP 102 is designated as the switching target included in the connection destination change request. Therefore, the wireless unit 226 of the MFP 100 functions as a receiving unit that can receive a connection destination change request.

In step S606, if the MFP 100 follows the connection destination change request received in step S605, the MFP 100 transmits a response indicating acceptance of switching, to the AP 101. If the MFP 100 does not follow the connection destination change request, the MFP 100 may transmit a switching rejection as a response. The response is transmitted as a BTM Response. In the example in FIG. 6, it is assumed that a response indicating acceptance of switching is transmitted.

In step S607, the AP 101 and the MFP 100 terminate the connection in the wireless infrastructure mode.

In step S608, the MFP 100 transmits a connection request to the AP 102 to connect to the AP 102 designated by the connection destination change request received in step S605.

As a result, in step S609, a connection between the MFP 100 and the AP 102 is established in the wireless infrastructure mode.

With such a mechanism, the MFP 100, which is an STA, can change the connection destination from the AP 101 to the AP 102 based on a connection destination change request from the AP 101 to which the MFP 100 was originally connected. The AP 101 and the AP 102 may be APs installed at different locations. That is to say, through the processing in FIG. 6, the MFP 100 can switch to another AP installed at a different location from the AP to which the MFP 100 was originally connected. In addition, each AP may be compatible with a different frequency band of a plurality of frequency bands (any two or three of the 2.4 GHz band, the 5 GHz band, and the 6 GHz band) provided by the same device. That is to say, through the processing in FIG. 6, the MFP 100 can switch to another frequency band provided by the same device as the AP to which the MFP 100 was originally connected. For example, the MFP 100 can change the connection destination to the 6 GHz band AP based on the connection destination change request.

Although the present embodiment describes an example in which a measurement request and a connection destination change request are transmitted from an AP using a mechanism compliant with the Wi-Fi Agile Multiband and the STA responds to these requests, the present invention is not limited to such an example. The present embodiment is also applicable to cases in which the STA makes a response or changes the connection destination AP (switches, deletes, or adds a connection destination AP) in response to a measurement request and a connection destination change request transmitted from an AP using a mechanism different from the above example.

Beacon Report

The beacon report (mentioned above for step S603) will be described in detail. The MFP 100 searches for APs around the MFP 100 or uses information acquired through a search that has been performed, to create a beacon report and transmits it to the AP 101. The MFP 100 can create a beacon report that does not include information regarding an AP if no AP is found and create a beacon report that includes information regarding a plurality of APs if a plurality of APs are found. The beacon report may include, as signal quality, the received signal strength and signal-to-noise ratio (S/N ratio) of a predetermined wireless signal including a beacon signal transmitted from each AP. In one example, the signal quality included in the beacon report may be associated with other parameters such as time of measurement. In addition to the received signal strength and S/N ratio, the beacon report may also include parameters indicating given signal quality such as a delay profile. In addition, the beacon report may also include additional information such as a flag indicating that the AP is connected, as information regarding the currently connected AP.

FIG. 8A shows examples of measurement results for each AP included in the beacon report. The beacon report includes, for each AP, a channel number 801, a received signal strength 802, an S/N ratio 803, and a basic service set identifier (BSSID) 804. Therefore, when a plurality of APs are present around the MFP 100, the beacon report may include a plurality of measurement results 800 shown in FIG. 8A.

The channel number 801 indicates the frequency band in which the AP has been detected, the received signal strength 802 indicates the received signal strength of the beacon signal that MFP 100 has received from the AP 101, and the S/N ratio 803 indicates the signal-to-noise ratio of the beacon signal that the MFP 100 has received from the AP 101. The BSSID is an identifier of the AP 101 encoded in the beacon signal that the MFP 100 has received from the AP 101.

Figure 7A:
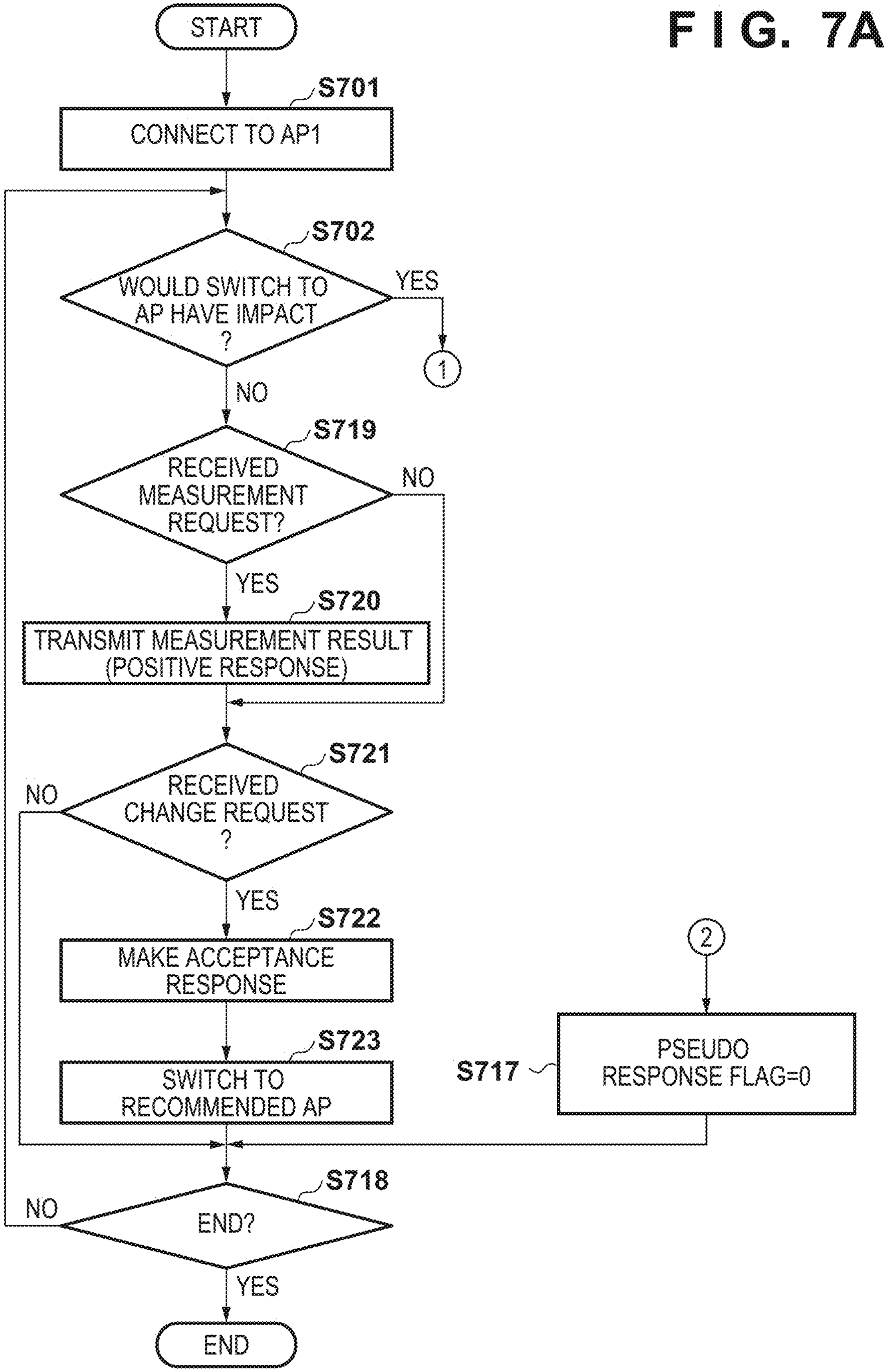
FIG. 7A is a flowchart illustrating an example of response transmission control processing performed in response to a measurement request from an AP.

Measurement Status Transmission Control Performed in Response to Measurement Request from AP Next, the control of the MFP 100 performed in response to a connection destination change request from the AP 101 will be described with reference to the flowchart in FIGS. 7A and 7B. Each step shown in the flowchart in FIGS. 7A and 7B is carried out by the CPU 212 loading a control program stored in a memory such as the ROM 213 into the RAM 214 and executing the program.

In step S701, the CPU 212 wirelessly connects to the AP 101 in the infrastructure mode. The wireless connection here is not a change based on a connection destination change request, but a connection using previously stored connection information (the SSID and the password) of the AP 101.

In step S702, the CPU 212 determines whether or not the operation state is a state in which switching to another AP has an impact.

If it is determined that the operation state is a state in which switching to another AP has an impact (Yes in step S702), processing proceeds to step S703, and if it is determined that the operation state is a state (a first operation state) other than the state in which switching to another AP has an impact (No in Step S702), processing proceeds to step S719. The first operation state is an operation state in which switching the connection destination AP based on a connection destination change request is allowed. The operational state in which switching to another AP has an impact is an operation state in which switching the connection destination AP based on a connection destination change request is undesirable. Examples of operation states in which switching the AP has an impact include an operation state in which firmware update processing is being performed by downloading firmware from the server 103. In addition, examples of operation states in which switching the AP has an impact include an operation state in which print processing is being performed upon receiving a print job from the mobile terminal device 104.

In step S703, the CPU 212 checks whether or not a measurement request (corresponding to step S601 in FIG. 6 described above) has been received from the AP 101. If a measurement request has been received from the AP 101 (Yes in step S703), the MFP 100 advances the processing to step S704, and if a measurement request has not been received (No in step S703), the MFP 100 advances the processing to step S708.

In step S704, the CPU 212 determines whether or not the reason switching the connection destination is not desirable (switch disable reason), which is the factor that leads to Yes in step S702, is strong. If the reason the connection destination cannot be switched is strong (Yes in step S704), processing proceeds to step S705, and if the reason the connection destination cannot be switched is weak (No in step S704), processing proceeds to step S706. The reason the connection destination cannot be switched is that the MFP 100 is in a specific operation state. For example, when the MFP 100 is in an operation state where the MFP 100 is performing print processing, communication is temporarily interrupted when the AP is switched, and printing on paper media continues in a state where data cannot be received, which causes a problem such as uneven printing. A weak reason for not being able to switch the connection destination is, for example, that even if communication is temporarily interrupted, processing can be completed normally when communication is resumed after the AP is switched, such as firmware update processing. In other words, examples of operation states of the MFP 100 in which AP switching has an impact may include an operation state in which the reason the connection destination cannot be switched is strong and an operation state in which the reason the connection destination cannot be switched is weak.

In the present embodiment, it is assumed that the state in which the MFP 100 is performing print processing is an operating state in which the reason the connection destination cannot be switched is strong, and the state in which the MFP 100 is performing a firmware update is an operation state in which the reason the connection destination cannot be switched is weak. However, which operation state is classified as an operation state in which the reason the connection destination cannot be switched is strong and which operation state is classified as an operation state in which the reason the connection destination cannot be switched is weak is not limited to this example.

In step S705, the CPU 212 transmits a beacon report to the AP 101 as a response to the measurement request, indicating that no APs other than the currently connected AP 101 are seen. Specifically, the CPU 212 transmits, to the AP 101, a beacon report that does not include signal quality measurement results from APs other than the currently connected AP 101. Alternatively, the CPU 212 creates a beacon report that does not include information regarding the measurement results of the signal quality of signals from the currently connected AP 101 and other APs and transmits the beacon report to the AP 101. That is to say, the response transmitted in step S705 does not include information regarding other access points, regardless of the signal quality that can be measured when an AP search is actually performed with respect to other access points. Such a response corresponds to the fact that no other APs are found even after performing an AP search, and therefore indicates that at least some values of the signal quality of signals from the other access points are worse than when an AP search is actually performed.

By transmitting a beacon report that does not include the signal quality measurement results of signals from an AP other than the currently connected AP 101 to the AP 101 as in step S705, it is possible to make the AP 101 recognize that there is no other AP to which the MFP 100 can connect when the MFP 100 is disconnected from the AP 101. Therefore, it can be expected that a connection destination change request is strongly prevented from being transmitted from the AP 101, and that the MFP 100 is prevented from forcibly disconnected from the AP 101.

Note that in step S705, a beacon report may be transmitted after detection of beacon signals transmitted from APs around the MFP 100 (AP search processing), or transmitted without performing AP search processing. For example, if the MFP 100 transmits a beacon report that includes only the measurement results of the currently connected AP 101, it is unlikely the MFP 100 accept an AP switching request. Furthermore, since the BSSID 804 of the currently connected AP 101 is necessary for connection to the AP 101, the BSSID 804 is stored in a memory such as the RAM 214. Therefore, parameters other than BSSID 804 may be set to predetermined specific values and a beacon report may be transmitted. Alternatively, if the MFP 100 stores the measurement results of the previous AP search processing in the storage device, the measurement results stored in the storage device before receiving the measurement request may be used as the measurement results regarding the currently connected AP 101 to transmit a beacon report.

In step S706, the CPU 212 transmits, as a response to the measurement request, a beacon report indicating that at least some values of the signal quality of signals from an AP other than the currently connected AP 101 are worse than the measurement results of the AP search processing. For example, in response to a measurement request, the MFP 100 transmits a beacon report in which at least one of the received signal strength (radio field strength) and signal-to-noise ratio (S/N ratio) of a beacon signal received from an AP found through an AP search is changed to a lower value. That is to say, the response transmitted in step S706 includes information indicating the signal quality of signals from another AP, which is information indicating a signal quality worse than the measurement results acquired by actually performing an AP search. This information indicates that another AP has been found through an AP search (measurements have been made), but the signal quality is poor.

As in step S706, even when the MFP 100 is disconnected from the AP 101, it is possible to make the AP 101 recognize that there is another AP that the MFP 100 can connect to, even though the connection status will not be excellent, by transmitting a beacon report to the AP 101 indicating that another AP has been found (a measurement has been performed), but the signal quality is poor. Therefore, it can be expected that a connection destination change request will be suppressed to some extent from being transmitted by an AP (if the connection status between the AP 101 and the MFP 100 is better than the status between another AP to which a pseudo response has been transmitted and the MFP 100). Therefore, the connection between the AP 101 and the MFP 100 can be maintained unless the connection between the AP 101 and the MFP 100 is lost or is under a very bad status. Furthermore, if the connection between the AP 101 and the MFP 100 is lost or is under a very bad status, it can be expected that a connection destination change request will be transmitted. Therefore, if the connection between the AP 101 and the MFP 100 is lost or the status is very poor, the connection destination can be switched to a recommended AP that can provide a more stable connection.

FIG. 8B shows examples of the measurement results of another AP (an AP that is not connected) included in the beacon report transmitted in step S706 when the measurement results shown in FIG. 8A are acquired as a result of an AP search. As described above, in step S706, the received signal strength 802 and the S/N ratio 803 regarding the wireless signal transmitted from an AP other than the AP 101 are set lower than those in FIG. 8A. In the examples shown in FIG. 8B, a received signal strength 805 is set to "1" and an S/N ratio 806 is set to "1". In this way, by transmitting a beacon report assuming that the quality of signals from an AP other than the currently connected AP 101 is poor, it is possible to prevent the connection from being switched from the currently connected AP 101.

Note that the values set in FIG. 8B may be based on the measurement results shown in FIG. 8A. For example, the received signal strength 805 in FIG. 8B may be changed from "200" to "50" by subtracting a predetermined number, for example, 150, from the received signal strength 802 in FIG. 8A. Similarly, the S/N ratio 806 in FIG. 8B may be changed from "65" to "15" by subtracting a predetermined number, for example, 50, from the S/N ratio 803 in FIG. 8A. In addition, for example, at least one of the received signal strength and the S/N ratio set in FIG. 8B may be set to 0 or a negative value.

Note that a beacon report may be created using measured information for some of a plurality of APs found through an AP search, thereby changing the priority order of the connection destination APs from the AP 101. For example, the MFP 100 can store, in the RAM 214 or the nonvolatile memory 215, the BSSID of APs to which the MFP 100 has been connected in the past and the IP addresses assigned at that time. In such a case, if the MFP 100 finds an AP that matches the current IP address, the MFP 100 can create a beacon report using the measured information and perform control so that the connection destination is preferentially switched to the AP.

In addition, there may cases where the received radio field strength and the S/N ratio are not set lower for an AP whose signal quality is better than the currently connected AP 101 by a predetermined value or more among a plurality of APs found through an AP search. For example, when the MFP 100 is downloading firmware through firmware download processing, if the connection to the currently connected AP 101 is terminated, it is necessary to restart the download of the firmware, which increases the time required for the download. However, if the signal quality of signals from the currently connected AP 101 is poor and the packet loss rate is high, and there is another AP with better signal quality than the currently connected AP 101, it may be possible to reduce the download time by switching the connection and downloading again. Therefore, among a plurality of APs found through an AP search, for the measurement results of APs whose signal quality is better than the currently connected AP 101 by a predetermined value or more, the response may be transmitted to the AP 101 without degrading the signal quality values. As a result, if there is an AP that has better signal quality than the currently connected AP 101 by a predetermined value or more and there is a possibility that the firmware download will finish earlier even if the connection is switched, the measurement results may be changed so that only requests to switch the connection to that AP will be accepted.

In addition, in step S706, for example, when responding by setting the received signal strength and S/N ratio of the measurement results for an AP other than the AP 101 currently connected in step S706 to predetermined values, the AP search may not be performed. For example, the MFP 100 may store measurement results acquired before receiving a measurement request in a storage device such as the RAM 214 or the nonvolatile memory 215. In such a case, the MFP 100 may identify the BSSID of an AP other than the currently connected AP 101 based on the stored measurement results, set the received signal strength and S/N ratio to predetermined values for that AP, and transmit a response.

In step S707, the CPU 212 sets 1 to a pseudo response flag stored in the RAM 214 in order to remember that the measurement status was changed and transmitted in step S705 or S706 (a response was transmitted using content different from actual measurement results).

In step S708, the CPU 212 checks whether or not a connection destination change request (BTM Request) has been received. This is a determination as to whether or not a request corresponding to step S605 in FIG. 6 described above has been received. If such a request has been received (Yes in step S708), processing proceeds to step S709, and if such a request has not been received (No in step S708), processing proceeds to step S716.

In step S709, the CPU 212 checks whether or not 1 is set to the pseudo response flag, and if 1 is not set (No in step S709), the CPU 212 advances processing to step S710, and if 1 is set (Yes in step S709), the CPU 212 advances processing to step S711.

In step S710, the CPU 212 ignores the connection destination change request (does not return a response to the connection destination change request) and returns processing to step S703. That is to say, in an operation state in which switching the AP has an impact (the state corresponding to the determination result "Yes" in step S702), the connection target AP is not changed before a pseudo response is transmitted in response to the measurement request to suppress the connection destination change that is based on the connection destination change request (before performing the processing in step S705 or S706), even if a change request has been received. As a result, it is possible to prevent the connection destination from being inadvertently changed even though it is not a state in which there is a strong reason to change the connection destination (a state in which the connection will be forcibly disconnected from the AP 101). Note that if a change rejection response is transmitted in step S710 in response to a connection destination change request, thereafter the AP 101 may not transmit another measurement request or connection destination change request to the MFP 100 that has transmitted a response indicating a rejection once. However, as described for step S706, in a very bad situation where a measurement request is transmitted from the AP 101 after that and the connection to the AP 101 is lost as a result of the MFP 100 responding to the request as in step S706, it is preferable that a connection destination change request is transmitted. Therefore, in order to ensure that a measurement request is transmitted even in an operation state in which switching to another AP has an impact (the state corresponding to the determination result "Yes" in step S702), control is performed not to respond to the request in step S710 instead of transmitting a response indicating a rejection.

In step S711, the CPU 212 checks the AP switch disable reason as in step S704, and if the AP switch disable reason is strong (Yes in step S711), the CPU 212 advances processing to step S712, and if the AP is weak (No in step S711), the CPU 212 advances processing to step S713.

In step S712, the CPU 212 rejects the connection destination change request and returns processing to step S703.

When the switch disable reason is strong, it is preferable that the connection to the AP 101 is maintained without changing the connection destination as much as possible, even in a very bad situation where the connection to the AP 101 may be lost. Therefore, there is no problem in this situation even if the AP 101 does not transmit a measurement request or a change request afterwards. Therefore, a response indicating a rejection is transmitted in step S712.

In step S713, the CPU 212 transmits a response indicating that the connection destination change request has been accepted. In step S714, the CPU 212 switches the connection destination to the AP specified in the connection destination change request. The processing in steps S713 and S714 corresponds to the processing in steps S606 to S608 in FIG. 6 described above. A situation in which a change request is transmitted from the AP 101 despite a pseudo-response transmitted in step S705 or S706 is assumed to be a very bad situation in which the connection to the AP 101 may be lost. In such a case, the MFP 100 changes the connection destination to the recommended AP through the processing in steps S713 and S714 unless there is a strong reason to reject the connection destination change. In this way, in extreme situations, priority is given to switching the connection destination to the recommended AP rather than keeping the connection destination at the AP 101, so that communication can be performed in a stable connection state.

In step S715, the CPU 212 sets the pseudo response flag to 0 and returns processing to step S703.

In step S716, the CPU 212 checks whether or not there is any change in the operation state checked in S702, in which processing that can be affected by switching to another AP is performed. If there is no change (No in step S716), the MFP 100 returns processing to step S703, and if there is a change (Yes in step S716, i.e., if the operation state has change to the first operation state), the MFP 100 advances processing to step S717. In step S717, the CPU 212 sets the pseudo response flag to 0 and advances processing to step S718.

In step S718, the CPU 212 checks whether or not a termination condition, such as wireless communication being turned off or power being turned off, is satisfied. If the termination condition is not satisfied (No in step S718), the MFP 100 returns processing to step S702, and if the termination condition is satisfied (Yes in step S718), the flowchart shown in FIGS. 7A and 7B is terminated.

In step S719, as in step S703, the CPU 212 determines whether or not a measurement request has been received from the currently connected AP. If a measurement request has been received, processing proceeds to step S720, and if a measurement request has not been received, processing proceeds to step S721.

In step S720, the CPU 212 searches for APs around the CPU 212 or uses information acquired through a search that has been performed, to create measurement results and transmits them to the AP 101. This processing corresponds to step S603 in FIG. 6. In this way, in the first state (the state corresponding to the determination result "No" in step S702) where there is no problem even if the connection destination is changed based on the connection destination change request, the contents acquired through the actual measurement (the measurement results) are transmitted in response to the measurement request (positive response).

In step S721, as in step S708, the CPU 212 determines whether or not a connection destination change request has been received. If a connection destination change request has been received, processing proceeds to step S722, and if a connection destination change request has not been received, processing proceeds to step S718. In step S722, the CPU 212 transmits a response indicating that the connection destination change request has been accepted. In step S723, the CPU 212 switches the connection destination to the AP specified in the connection destination change request. The processing in steps S722 and S723 corresponds to the processing in steps S606 to S608 in FIG. 6 described above.

In the description of the example in FIGS. 7A and 7B, it is assumed that, if it is determined that the operation state is a state in which switching from the currently connected AP 101 to another AP has an impact (Yes in step S702), whether the processing in step S705 or the processing in step S706 is to be performed in response to the measurement request is switched depending on the strength of the switch disable reason. However, the processing in step S704 may be omitted, and if this is the case, when the measurement request is received in S703, the processing in either step S705 or S706 may be performed without determining the connection destination switch disable reason.

As described above, according to the present embodiment, in a situation where it is undesirable to change the connection destination based on a connection destination change request, the MFP 100 transmits a false response indicating a situation worse than the actually measured situation with respect to the other APs around the MFP 100 in response to a measurement request received from the currently connected AP. As a result, it is possible to prevent the currently connected AP from transmitting a connection destination change request to request that the connection destination be changed to another AP. In this way, in a situation where it is undesirable to change the connection destination based on a connection destination change request, it is possible to prevent the connection destination from being changed based on a connection destination change request. That is to say, it is possible to prevent an inappropriate change of the connection destination access point, and to change the connection destination access point more appropriately. The various types of control described above as performed by the CPU 212 may be performed by a single piece of hardware, or a plurality of pieces of hardware (e.g., a plurality of processors or circuits) may share the processing to control the entire device.

In addition, although various example embodiments have been described, the present invention is not limited to these specific embodiments, and embodiments of the present disclosure also includes various forms without departing from the spirit of the present invention. Furthermore, each of the example embodiments described above is merely an embodiment of the present invention, and it is also possible to combine embodiments as appropriate.

Although the above-described embodiments describe an example in which features of the present disclosure are applied to the MFP 100, the present invention is not limited to this example, and the present invention is applicable to any wireless device that functions as an STA capable of performing processing in response to a connection destination change request from a change from an AP. It is applicable to any functional wireless device. That is to say, embodiments of the present disclosure are applicable to personal computers, PDAs, tablet terminals, mobile phone terminals such as smartphones, music players, game consoles, electronic book readers, smart watches, and various measuring devices (sensor devices) such as thermometers and hygrometers. Furthermore, the present invention is applicable to digital cameras (including still cameras, video cameras, network cameras, and security cameras), printers, scanners, and drones. Furthermore, embodiments of the present disclosure are applicable to video output devices, audio output devices (for example, smart speakers), media streaming players, wireless LAN adapter devices (adapters) that can be connected to USB terminals or LAN cable terminals, and so on. Examples of video output devices include a device that realizes streaming playback on a display device or mirroring display (displaying the content displayed on an electronic device also on a display device) by acquiring (downloading) a video on the Internet specified by a URL designated by an electronic device and outputting the video to a display device connected via a video output terminal such as HDMI (registered trademark). Examples of video output devices also include a television, a media player such as a hard disk recorder, a Blu-ray recorder, a DVD recorder, a head-mounted display, a projector, a television, a display device (monitor), a signage device, and so on. The present disclosure is also applicable to Wi-Fi connectable devices called smart home appliances, such as air conditioners, refrigerators, washing machines, vacuum cleaners, ovens, microwave ovens, lighting equipment, heating equipment, cooling equipment, and so on.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-108525, filed Jun. 30, 2023 hereby incorporated by reference herein in its entirety.

What is claimed is:

1. An electronic apparatus comprising:

a communication module configured to receive a first request for requesting measurement results of qualities of signals from access points around the electronic apparatus, and a connection destination change request, the first request and the connection destination change request being transmitted from a first access point to which the electronic apparatus is currently connected;

at least one memory and at least one processor which function as:

measuring unit configured to measure qualities of signals received from the access points around the electronic apparatus, based on wireless signals received from the access points around the electronic apparatus; and control unit configured to perform control to, when the first request is received, in a case where the electronic apparatus is in a first operation state, make a response to the first access point, using a first content indicating results of measurement by the measuring unit with respect to qualities of signals from one or more other access points different from the first access point, and in a case where the electronic apparatus is in a second operation state that is different from the first operation state, make a response to the first access point, using a second content indicating that the qualities of signals from at least one of the one or more other access points is worse than the qualities of the signals measured by the measuring unit with respect to the at least one of the one or more other access points.

2. The electronic apparatus according to claim 1, wherein the second content indicates that received signal strengths of wireless signals received from the one or more other access points are weaker than received signal strengths indicated by the results of the measurement by the measuring unit.

3. The electronic apparatus according to claim 1, wherein the second content indicates that signal-to-noise ratios of the wireless signals received from the one or more other access points are lower than signal-to-noise ratios indicated by the results of the measurement by the measuring unit.

4. The electronic apparatus according to claim 1, wherein the second content does not include the measurement results of the qualities of the signals from the one or more other access points, regardless of signal qualities that can be measured by the measuring unit with respect to the one or more other access points.

5. The electronic apparatus according to claim 1, wherein the one or more other access points include a second access point and a third access point that are different from the first access point, when the electronic apparatus is in the second operation state, the second content indicates that qualities of signals from the second access point are worse than the results of the measurement by the measuring unit, and qualities of signals from the third access point indicate the results of the measurement by the measuring unit.

6. The electronic apparatus according to claim 1, wherein, when the change request is received after the electronic apparatus enters the second operation state and before the first request is received, the control unit performs control not to change a connection destination in response to the change request and not to make a response to the change request.

7. The electronic apparatus according to claim 1, wherein, when the change request is received after a response is made to the first request using the second content, the control unit performs control to change a connection destination in response to the change request.

8. The electronic apparatus according to claim 1, further comprising:

a storage configured to store the results of the measurement by the measuring unit, wherein, when the first request is received when the electronic apparatus is in the second operation state, the control unit performs control to make a response using the results of the measurement stored in the storage unit, without the measurement unit performing a measurement.

9. The electronic apparatus according to claim 1, further comprising:

a printing module for performing printing processing, wherein the second operation state includes a state in which the printing module is performing printing processing.

10. The electronic apparatus according to claim 1, wherein the second operation state includes a state in which firmware update processing for the electronic apparatus is being performed.

11. The electronic apparatus according to claim 1, when the first request is received when the electronic apparatus is in the first operation state, the control unit makes a response to the first access point after the measuring unit measures the qualities of the signals from the access points around the electronic apparatus.

12. The electronic apparatus according to claim 1, wherein the second content includes information indicating the qualities of the signals from the one or more other access points and indicating signal qualities worse than the results of the measurement by the measuring unit, and when the electronic apparatus is in a third operation state that is different from the first and second operation states, the control unit performs control to make a response to the first request, using a third content that does not include measurement results of wireless signals transmitted from the one or more other access points, regardless of signal qualities that can be measured by the measuring unit with respect to the one or more other access points.

13. The electronic apparatus according to claim 12, further comprising:

a printing module for performing printing processing, wherein the second operation state includes a state in which firmware update processing for the electronic apparatus is being performed, and the third operation state includes a state in which the printing module is performing printing processing.

14. The electronic apparatus according to claim 1, wherein the electronic apparatus is configured to perform an operation compatible with at least one of orthogonal frequency-division multiple access (OFDMA) and target wake time (TWT).

15. The electronic apparatus according to claim 1, wherein the electronic apparatus is configured to operate in compliant with IEEE 802.11ax.

16. The electronic apparatus according to claim 1, wherein, when the control unit is to perform control to change a connection target in response to the change request, the control unit performs control to change the connection destination to an access point that uses a 6 GHz frequency band.

17. An electronic apparatus comprising:

a communication module configured to receive a first request for requesting measurement results of qualities of signals from access points around the electronic apparatus, and a connection destination change request, from a first access point to which the electronic apparatus is currently connected;

at least one memory and at least one processor which function as:

a measuring unit configured to measure qualities of signals from the access points around the electronic apparatus, based on wireless signals received from the access points around the electronic apparatus; and a control unit configured to perform control to, when the first request is received, in a case where the electronic apparatus is in a first operation state, make a response to the first access point, using a first content including measurement results of qualities of signals from one or more other access points different from the first access point, and in a case where the electronic apparatus is in a second operation state that is different from the first operation state, make a response to the first access point, using a second content that does not include the measurement results by the measuring unit of the qualities of the signals from the one or more other access points, regardless of signal qualities that can be measured by the measuring unit with respect to the one or more other access points.

18. The electronic apparatus according to claim 17, wherein, when the first request is received when the electronic apparatus is in the second operation state, the control unit performs control to make a response to the first access point without the measurement unit performing a measurement.

19. An electronic apparatus control method carried out in an electronic apparatus, comprising:

receiving a first request for requesting measurement results of qualities of signals from access points around the electronic apparatus, and a connection destination change request, the first request and the connection destination change request being transmitted from a first access point to which the electronic apparatus is currently connected;

measuring qualities of signals from the access points around the electronic apparatus, based on wireless signals received from the access points around the electronic apparatus; and performing control to, when the first request is received, in a case where the electronic apparatus is in a first operation state, make a response to the first access point, using a first content indicating results of measurement with respect to qualities of signals from one or more other access points different from the first access point, and in a case where the electronic apparatus is in a second operation state that is different from the first operation state, make a response to the first access point, using a second content indicating that the qualities of signals from at least one of the one or more other access points is worse than the qualities of the signals measured by the measuring with respect to the at least one of the one or more other access points.

20. An electronic apparatus control method carried out in an electronic apparatus, comprising:

receiving a first request for requesting measurement results of qualities of signals from access points around the electronic apparatus, and a connection destination change request, from a first access point to which the electronic apparatus is currently connected;

measuring qualities of signals from the access points around the electronic apparatus, based on wireless signals received from the access points around the electronic apparatus; and performing control to, when the first request is received, in a case where the electronic apparatus is in a first operation state, make a response to the first access point, using a first content including measurement results of qualities of signals from one or more other access points different from the first access point, and in a case where the electronic apparatus is in a second operation state that is different from the first operation state, make a response to the first access point, using a second content that does not include the measurement results by the measuring of the qualities of the signals from the one or more other access points, regardless of signal qualities that can be measured with respect to the one or more other access points by the measuring.

21. A non-transitory computer-readable storage medium that stores a program for enabling a computer to perform an electronic apparatus control method comprising:

receiving a first request for requesting measurement results of qualities of signals from access points around the electronic apparatus, and a connection destination change request, the first request and the connection destination change request being transmitted from a first access point to which the electronic apparatus is currently connected;

measuring qualities of signals from the access points around the electronic apparatus, based on wireless signals received from the access points around the electronic apparatus; and performing control to, when the first request is received, in a case where the electronic apparatus is in a first operation state, make a response to the first access point, using a first content indicating results of measurement with respect to qualities of signals from one or more other access points different from the first access point, and in a case where the electronic apparatus is in a second operation state that is different from the first operation state, make a response to the first access point, using a second content indicating that the qualities of signals from at least one of the one or more other access points is worse than the qualities of the signals measured by the measuring with respect to the at least one of the one or more other access points.

22. A non-transitory computer-readable storage medium that stores a program for enabling a computer to perform an electronic apparatus control method comprising:

receiving a first request for requesting measurement results of qualities of signals from access points around the electronic apparatus, and a connection destination change request, from a first access point to which the electronic apparatus is currently connected;

measuring qualities of signals from the access points around the electronic apparatus, based on wireless signals received from the access points around the electronic apparatus; and performing control to, when the first request is received, in a case where the electronic apparatus is in a first operation state, make a response to the first access point, using a first content including measurement results of qualities of signals from one or more other access points different from the first access point, and in a case where the electronic apparatus is in a second operation state that is different from the first operation state, make a response to the first access point, using a second content that does not include the measurement results by the measuring of the qualities of the signals from the one or more other access points, regardless of signal qualities that can be measured with respect to the one or more other access points by the measuring.

* * * * *